Oct. 7, 1952        J. LANVERMEYER        2,613,120
HOUSING FOR ANTIFRICTION BEARINGS
Filed Sept. 14, 1949
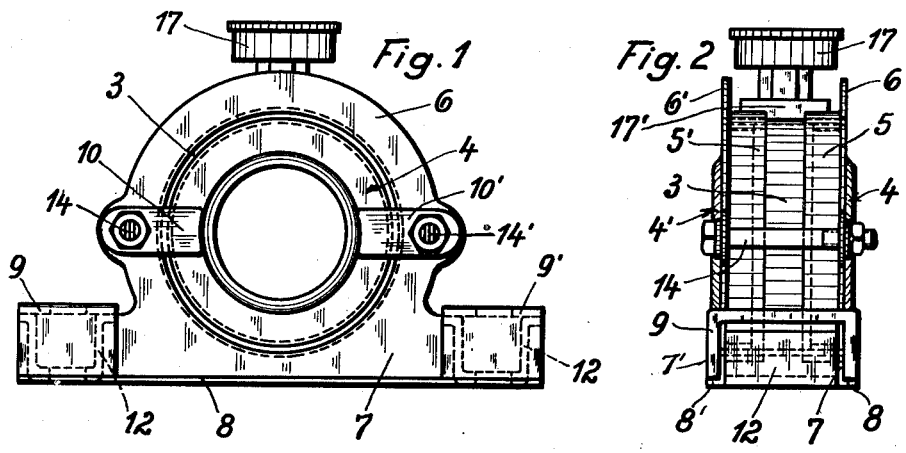
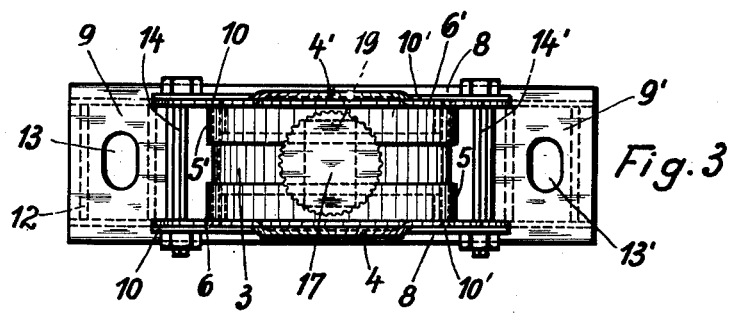
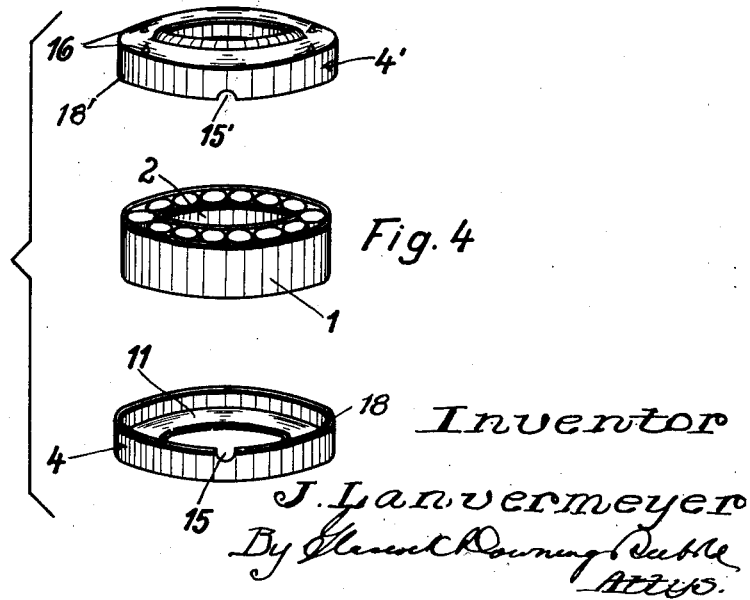
Inventor
J. Lanvermeyer
By Stewart Downing Ruble
Attys.

Patented Oct. 7, 1952

2,613,120

UNITED STATES PATENT OFFICE 2,613,120

HOUSING FOR ANTIFRICTION BEARINGS

Julius Lanvermeyer, Melle, Germany

Application September 14, 1949, Serial No. 115,597
In Germany January 31, 1949

4 Claims. (Cl. 308—207)

This invention relates to a housing for antifriction bearings, for example for ball or roller bearings.

The invention proposes the production of housings for anti-friction bearings having a greatly reduced weight and made principally of sheet metal parts.

Hitherto housings for anti-friction bearings were cast, the outer race of the anti-friction bearing being inserted in the housing opening correspondingly provided in the casting and machined.

According to the invention, a retaining ring, into which the outer race of the anti-friction bearing is inserted, is encircled about its circumference by a sheet metal part which at the same time forms the base plate of the bearing. The retaining ring and the sheet metal part are rigidly connected with each other, preferably by spot welding, or the sheet metal part may be "shrunk" on the ring.

In the case of an arrangement of two symmetrical sheet metal parts, each of these sheet metal parts preferably is formed with an opening for the retaining ring, the margin of this opening being turned inwardly substantially at right angles to form a flange which fits closely about the outside of the retaining ring, and having a portion which widens toward the bottom to form a foot whose lower edge is bent to form a supporting surface, the projecting ends of the foot portions of the sheet metal parts being connected with each other in such a way that they can receive fastening means for fastening the housing to its support.

Further characteristics of the invention will result from the following description and accompanying drawings, in which:

Fig. 1 shows a front view of a bearing housing according to the invention;

Fig. 2 shows a side view of the same bearing;

Fig. 3 shows a plan view of the same bearing; and

Fig. 4 is an exploded view of certain parts of the bearing.

The anti-friction bearing shown in Fig. 4 is inserted with its outer race 1 into a seamless pipe 3 with a force fit. The inner race 2 is adapted to receive a shaft. The bearing is held in the pipe 3 on each side by caps indicated generally by numerals 4 and 4', respectively, which likewise are inserted into the pipe 3. The ring 3 is encircled at its two ends by the tubular projecting flanges 5, 5' which are pressed out of corresponding sheet metal pieces 6, 6' which are widened toward the bottom to form foot portions 7, 7'. The lower edges of the foot portions 7, 7' are provided with bent supporting surfaces 8 and 8' respectively of flanges.

The tubular flanges 5, 5' are connected with the ring 3 by spot welding or by a shrinking fit. The members 6, 6' are connected with each other at the ends of their foot portions by clamps 9, 9' by means of spot welding. The clamps 9, 9' have openings 13, 13' to receive screws with which the bearing is fastened to a support, such as the framework of a machine, or floor, or wall.

The caps 4, 4' having inwardly turned marginal flanges 18, 18' for slidably supporting the caps within the ring 3, are held by lugs 10, 10' which are held by threaded bolts 14, 14' provided with nuts, against the sheet metal parts 6, 6'.

Lubrication of the bearing is provided by a grease cup 17 whose outlet opening leads into an axially extending longitudinal opening 19 in the pipe 3. A base 17' may be welded on the ring 3 to support the grease cup, or a collar may be drawn upwardly from the ring 3. From the opening 19 the grease penetrates through recesses 15, 15' in the flanges of the caps 4, 4' into the housing. A disk 11 is welded in the cap, and between the disk 11 and the front side of the cap a felt insert is provided which prevents the grease from escaping from the bearing. On their front surfaces the caps 4, 4' have small projections 16, which may be made, for example, by punching. The projections 16 serve as marks for the correct position of the caps in order that the cavity 15 will be in alignment with the lubrication opening in the retaining ring.

For the reinforcement of the clamps 9 there may be inserted below them additional supporting parts 12. The bolts 14, 14' may be designed as spacing bolts or may support a tubular element as a spacing support between the sheet metal parts, 6, 6'.

Having thus fully described the invention, what is claimed and desired to be secured by Letters Patent, is:

1. A housing for antifriction bearings of the type having a base and an outer bearing race, including a separate independent tubular retaining ring encircling said bearing race, a pair of sheet metal elements formed so as to completely encircle the outside of said retaining ring, each of said sheet metal elements having a foot portion, said sheet metal elements being disposed one at each end of the retaining ring with the foot portions arranged in symmetrical spaced relationship so that each of the foot portions forms a longitudinally extending side of the base of the housing.

2. A housing for antifriction bearings of the type having an outer bearing race, including a tubular retaining ring encircling said bearing race, a pair of sheet metal elements having an opening therein and a flange extending laterally of the axis of the opening, each of said elements encircling the retaining ring and including an integral foot portion, the margin of the foot portion of each of the sheet metal elements being turned substantially at right angles to the flange to provide a supporting surface for the housing, said sheet metal elements being disposed in spaced relationship on the retaining ring and connecting means for joining the spaced foot portions to each other and for receiving fastening means for the housing.

3. A housing for antifriction bearings of the type having a base and an outer bearing race and including a tubular retaining ring encircling said bearing race and a pair of sheet metal elements formed so as to completely encircle the outside of said retaining ring, each of said sheet metal elements having a foot portion, the said tubular retaining ring for the outer bearing race being provided with an opening for the passage of lubricant, a sheet metal cap having its peripheral margin turned substantially at right angles to form a flange for slidable engagement with the inner surface of the retaining ring, said flange having a recess to permit passage of said lubricant, and indicia means on the exposed surface of the cap to permit visual alignment of the recess and said opening when the cap is positioned within the retaining ring.

4. A housing for antifriction bearings of the type including an outer bearing race, said housing including a pair of spaced sheet metal elements having an opening therein defined by flanges extending substantially at right angles to the plane of the element, said elements being disposed in spaced relationship with the respective flanges of the elements directed toward one another, means maintaining the elements in spaced relationship, a tubular retaining ring inserted in the openings of the elements and secured to the flanges, said outer bearing race being disposed within and being encircled by said ring, caps including lateral flanges slideably mounted about said outer bearing race, closing the opposite ends of the bearing and fitting between the race and the said retaining ring and said assembled caps and retaining ring having openings therein through which a lubricant can flow for lubricating the bearing.

JULIUS LANVERMEYER.

REFERENCES CITED

The following references are of record in the file of this patent:

UNITED STATES PATENTS

| Number | Name | Date |
|---|---|---|
| 1,729,499 | Anthoni | Sept. 24, 1929 |
| 1,952,274 | Mitchell | Mar. 27, 1934 |

FOREIGN PATENTS

| Number | Country | Date |
|---|---|---|
| 378,142 | Germany | July 5, 1923 |
| 463,065 | Germany | July 21, 1928 |
| 544,367 | Germany | Sept. 28, 1931 |